W. F. MOODY.
ELECTRIC BRAKE.
APPLICATION FILED MAY 20, 1910.

998,976.

Patented July 25, 1911.

2 SHEETS—SHEET 1.

WITNESSES:

INVENTOR
William F. Moody
BY Munn & Co.
ATTORNEYS

W. F. MOODY.
ELECTRIC BRAKE.
APPLICATION FILED MAY 20, 1910.
998,976.
Patented July 25, 1911.
2 SHEETS—SHEET 2.
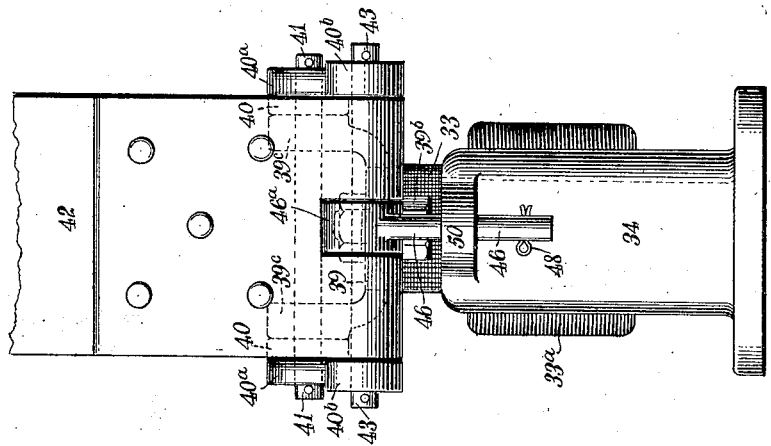
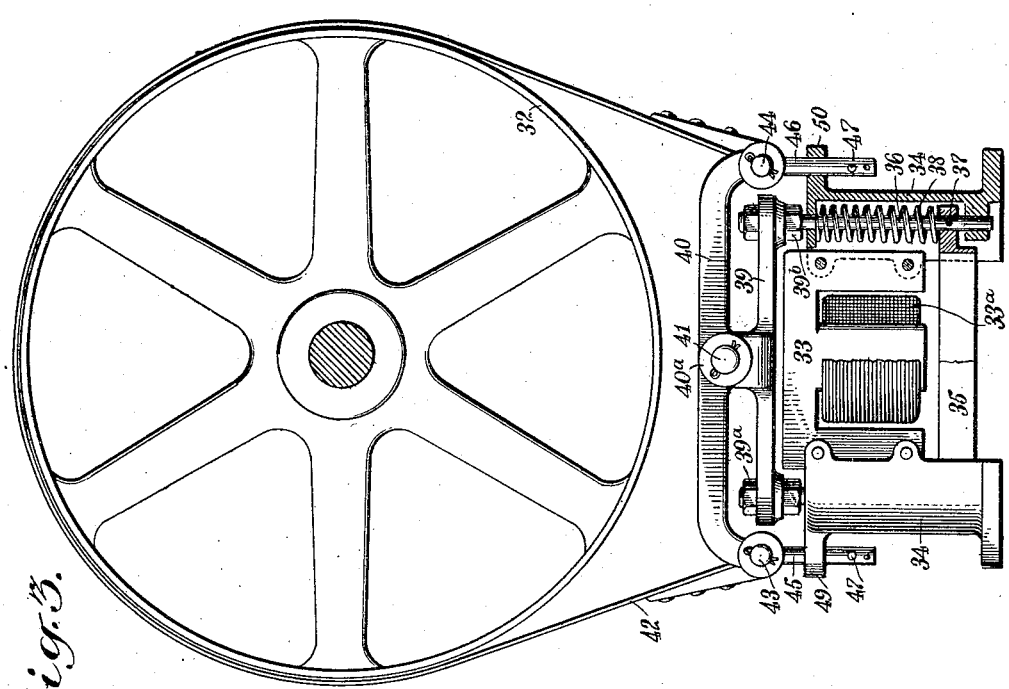
WITNESSES:
Geo. N. Naylor
Walton Harrison.
INVENTOR
William F. Moody
BY Munn & Co
ATTORNEYS

UNITED STATES PATENT OFFICE.

WILLIAM FORD MOODY, OF DENVER, COLORADO.

ELECTRIC BRAKE.

998,976.          Specification of Letters Patent.     Patented July 25, 1911.

Application filed May 20, 1910. Serial No. 562,551.

*To all whom it may concern:*

Be it known that I, WILLIAM F. MOODY, a citizen of the United States, and a resident of Denver, in the county of Denver and State of Colorado, have invented a new and Improved Electric Brake, of which the following is a full, clear, and exact description.

My invention relates to electric brakes of the kind provided with a flexible brake band, my more particular purpose being to provide in connection with the band a rocking member so arranged that its ends are connected with the ends of the brake band and the braking force is applied to its middle portion, so that when the brake is set the position of the rocking member is changed by the tension of the brake band; one end of the rocking member acts for the moment as a fixed pivot and the opposite end pulls upon the opposite end of the brake band, so that the rocking member operates as a lever of the third class and applies the braking force most effectively, and with the least expenditure of power.

My invention further comprehends mechanism for rendering the action of the locking member reversible so that the advantages of the brake are secured, no matter whether the rotation of the revoluble member to be operated upon be in either of two directions, the principle of the brake being thus rendered applicable for use in connection with elevators, hoisting machinery, and in fact in all relations where a revoluble shaft turning in both directions is employed in connection with a brake.

My device is adapted for use with brakes employing either direct or alternating current, and for making this point clear I show and describe one form of the invention suitable for use with direct current and another form more particularly adapted for alternating currents, the mechanism being so arranged as to greatly reduce the first cost of the brake and also (which is highly important in alternating current practice) to reduce the current consumption. In the devices shown the brake is applied by opening the main circuit, thereby deënergizing the magnet in the manner well known in this art.

Reference is to be had to the accompanying drawings forming a part of this specification, in which similar characters of reference indicate corresponding parts in all the figures.

Figure 2:
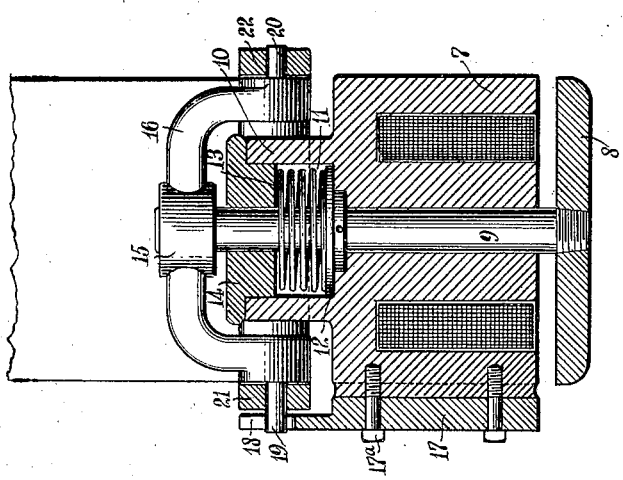
Figure 1:
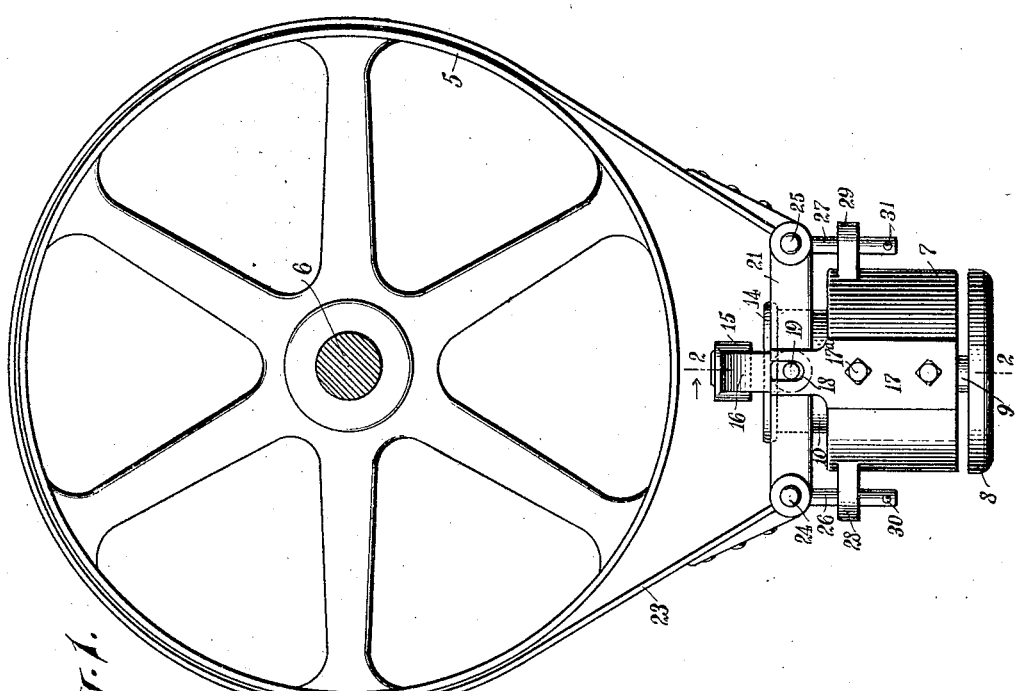

Figure 1 is a side elevation showing one form of my improved electric brake which in this instance is suitable for use in connection with direct currents; Fig. 2 is an enlarged section on the line 2—2 of Fig. 1, looking in the direction of the arrow; Fig. 3 is a view partly in elevation and partly in section, showing another form of my improved brake which, in this instance, is built for use with alternating currents; and Fig. 4 is a fragmentary side elevation of the mechanism shown in Fig. 3.

At 5 is a pulley which is mounted upon a revoluble shaft 6.

At 7 is a magnet and movable relatively to the same is an armature 8 carried upon a stem 9. The magnet 7 is provided with a spring case 10 having a compartment 11 therein. A disk 12 is mounted rigidly upon the stem 9 and is adapted to move within the compartment 11. A spring 13 is housed within this compartment and presses upon the disk 12. A closure ring 14 presses upon the spring 13 and engages the top of the spring case 10. The stem 9 is provided with a head 15 which supports a yoke 16.

At 17 is a guide strip which is connected by bolts 17ª with the magnet, this guide strip being provided at its top with a slot 18. The yoke 16 is provided with pins 19, 20 extending directly outward in opposite directions, the pin 19 being longer than the pin 20 and extending through the slot 18.

At 21, 22 are a pair of rocking bars which are journaled upon the pins 19, 20.

A brake band 23 encircles the pulley 5 and is connected with pins 24, 25, the latter being carried by the ends of the rocking bars and pivotally connected with the respective pins 26, 27 which extend through ears 28, 29 carried by the magnet. Cotter pins 30, 31 extend diametrically through the guide pins 26, 27 and are adapted to lodge against the ears 28, 29. The pin 30 lodges against the ear 28 when the rocking bars are rocked in a clockwise direction according to Fig. 1, and the cotter pin 31 lodges against the ear 29 whenever the rocking bars are rocked in the opposite direction.

The operation of the mechanism shown in Figs. 1 and 2 is as follows: As in most other electric brakes, the electro-magnet is normally energized, the brake being normally idle. When, however, the magnet is deënergized this causes the setting of the brake which takes place under the impulses of the spring 13. It will be noted from the construction, however, that when the magnet shown in Figs. 1 and 2 is deënergized, so that the armature 8 is, under action of the spring 13, forced downwardly so that the pins 19, 20 are lowered, the rocking bars 21, 22 are nevertheless free to rock a little in a direction which coincides with the direction of rotation of the pulley. Suppose, then, that according to Fig. 1 the pulley 5 is turning in a clockwise direction, and that the magnet 7 is deënergized. The brake band being tightened a little, the guide pin 26 is drawn upward until the cotter pin 30 lodges against the under side of the ear 28. The pivot pin 24 thereupon becomes in effect a fixed pivot for the rocking bars 21, 22, the opposite ends of these rocking bars being free relatively to the ear 29, and the cotter pin 31 being in its lowermost position, considerably out of engagement with the ear 29. It is clear, then, that the rocking bars 21, 22, together act as a lever of the third class and pull directly upon the right hand portion of the brake band according to Fig. 1. The braking action is thus rendered very effective and is moreover accompanied by a comparatively slight expenditure of energy. Suppose, however, that the rotation of the member 5 is in the opposite direction—that is, in a counterclockwise direction according to Fig. 1. The braking action is thereupon just reversed, the pivot pin 24 moves downwardly. The brake thus described is therefore applicable to mechanism in which the direction of rotation is reversible. The braking force is applied midway between the ends of the rocking bars, no matter what may be the direction of rotation of the member to be braked.

In the mechanism shown in Figs. 3 and 4 the pulley is shown at 32, the magnet at 33 and its winding at 33ª. Supporting this magnet is a casing 34 and movably mounted within the bottom of this casing is an armature 35. Guide pins 36 are connected rigidly with this armature by aid of fastening members 37. Encircling the guide pins 36 are spiral springs 38 which normally tend to lower the armatures relatively to the casing and magnet. A beam 39 is connected with the pins 36 by aid of nuts 39ª and 39ᵇ. At 40 is the brake lever which is provided with bearings 40ª and by aid thereof is mounted to rock upon a pivot pin 41. A brake band 42 is connected with pins 43, 44 carried by the outer ends of the brake lever. Guide pins 45, 46 are journaled upon the pins 43, 44 and extend through ears 49, 50 which serve as guides. The guide pins 45, 46 are provided with holes 47 through which extend cotter pins 48.

The operation of the mechanism shown in Figs. 3 and 4 is very much like that above described with reference to the other figures. The tendency of the springs 38 being to force the armature 35 downwardly, the setting of the brake is accomplished by deënergizing instead of by energizing the magnet 33. The magnet being deënergized and the armature 35 being forced downwardly, the beam 39 and the rocking lever 40 are also lowered. The brake band being tightened slightly, the guide pin 45 or 46, as the case may be, is drawn upwardly until its cotter pin stops against the under side of the adjacent ear 49 or 50, after which the brake lever 40 swings upon practically a fixed pivot, the direction of the rocking movement of the brake lever coinciding with the direction of rotation of the pulley to be braked. The form of brake shown in Figs. 3 and 4 embodies all of the advantages above described with reference to the brake shown in Figs. 1 and 2.

It will be noted that in both of the mechanisms above described, whenever one end of the brake lever becomes fixed, so that the lever operates practically upon a fixed pivot, the opposite or free end of the lever is at the so-called "slack" end of the brake band; that is to say, that portion of the band where the tension is the smallest. There is considerable advantage in this arrangement and this advantage manifests itself as above stated both in the original cost of the brake and in the saving of current. In many instances, especially where alternating current is applied, a considerable amount of energy must be expended in connection with the brake. Moreover, the constant opening and closing of the circuit controlling the brake, is necessarily a disturbing factor, which is reduced to a minimum by this arrangement which calls for the use of comparatively little current. The excessive current demanded for releasing brakes operated by magnets or solenoids, is oftentimes a serious strain upon the generators or transformers from which the current is derived. This is especially true of residence districts where the custom is to install transformers not especially adapted for taking care of irregularities in the current due to the opening and closing of the various circuits. In instances of this kind, where for a moment there is a considerable rush of current in excess of the regular demand, there is a corresponding drop in the voltage and a serious decline in the energy of the motor operating the machine to which the brake is connected, as well as other motors in the neighborhood. In one instance of this kind it happens that a ten horse power motor operating on an alternating current circuit, required a momentary rush of 2700 watts to produce a given braking effect when the same effect was secured for a similar installation operating on direct current by an expenditure of only 300 watts. Taking into consideration facts of this kind, it is obvious that any device capable of reducing the total mechanical effort necessary for braking must result in a corresponding decrease in the disturbance of the circuit (and especially if alternating currents be used) on which the brake is employed.

The reason why the form shown in Figs. 1 and 2 is suitable for direct current and that appearing in Figs. 3 and 4 is better for alternating currents, is traceable to the fact that alternating currents are, if used in proximity to bodies of iron, wasteful of energy unless said bodies of iron are laminated or otherwise prevented from setting up eddy currents. Referring now to the bottom of Fig. 3, it will be noted that the core of the magnet 33 is made up of E-shaped stampings, which is not the case with the core shown in Fig. 2. The E-shaped stampings constitute laminations which, by preventing the undue formation of eddy currents prevent waste of the alternating currents used for energizing the magnet 33.

With my improved brake above described, the energy required to produce a given braking effect, is a great deal less than would be the case if the pull exerted by the spring were transferred to the other, high tension, end of the band, without changing the direction of rotation of the shaft to which the braking action is applied.

I do not limit myself to the precise details of construction herein shown and described, nor in all instances to the exact arrangement set forth for the various parts, the scope of my invention being commensurate with my claims.

Having thus described my invention, I claim as new and desire to secure by Letters Patent:

1. In a brake, the combination of a brake band for encircling a revoluble member, a rocking lever having its ends connected with the ends of said brake band, a fixed magnetic member, an armature therefor, said armature being free to move toward and from said revoluble member, a frame mounted rigidly upon said armature and movable directly therewith toward and from said revoluble member, said frame being journaled to said lever at a point intermediate the ends of said brake band, and spring mechanism for moving said armature in a direction contrary to the direction in which said armature is attracted by said magnetic member.

2. In a brake, the combination of a casing, guide pins slidably engaging the same, an armature carried by said guide pins, a magnetic member mounted within said casing and adapted to move said armature in one direction by attraction, springs encircling said guide pins and engaging said casing and said armature for moving said armature away from said magnetic member, a beam supported upon said guide pins and by aid thereof movable with said armature, a brake lever journaled upon said beam and adapted to rock, and a brake band for encircling a revoluble member, said brake band having its ends connected with the ends of said brake lever.

3. In a brake, the combination of a brake band for encircling a revoluble member, a brake lever connected with the ends of said brake band, mechanism including a member journaled to said brake lever for shifting said lever in order to aid in setting and releasing said brake band, guide pins pivotally mounted adjacent to the ends of said brake band, and means for limiting the travel of said guide pins.

4. In a brake, the combination of a brake band for encircling a revoluble member, a brake lever having its ends connected with the ends of said brake band, a beam journaled to the proximate middle of said lever and adapted to move bodily toward and from said revoluble member, guide pins connected with said beam, an armature mounted upon said guide pins, a magnetic member for attracting said armature, and spring mechanism for retracting said armature.

In testimony whereof I have signed my name to this specification in the presence of two subscribing witnesses.

WILLIAM FORD MOODY.

Witnesses:
SAMUEL H. BAKER,
J. P. MOODY.

---

Copies of this patent may be obtained for five cents each, by addressing the "Commissioner of Patents, Washington, D. C."